United States Patent [19]

Nagase et al.

[11] 4,152,170

[45] May 1, 1979

[54] CROSS-LINKED PULLULAN

[75] Inventors: Tsuneyuki Nagase; Kozo Tsuji, both of Takatsuki; Masanori Fujimoto; Fujio Masuko, both of Ibaraki, all of Japan

[73] Assignees: Sumitomo Chemical Company, Ltd., Osaka; Hayashibara Biochemical Laboratories, Inc., Okayama, both of Japan

[21] Appl. No.: 695,762

[22] Filed: Jun. 14, 1976

[30] Foreign Application Priority Data

| Jun. 18, 1975 | [JP] | Japan | 50-74811 |
| Jun. 19, 1975 | [JP] | Japan | 50-75247 |
| Jun. 19, 1975 | [JP] | Japan | 50-75248 |
| Jun. 20, 1975 | [JP] | Japan | 50-76266 |
| Jun. 20, 1975 | [JP] | Japan | 50-76267 |

[51] Int. Cl.² ..................... C08B 37/00; C08L 5/00
[52] U.S. Cl. ........................................ 106/162; 536/1
[58] Field of Search ............... 260/17.45 T, 17.4 R; 106/169, 208, 162; 195/31 P; 536/1, 112

[56] References Cited

U.S. PATENT DOCUMENTS

| 3,658,745 | 4/1972 | Merrill | 260/17.4 R |
| 3,871,892 | 3/1975 | Hijiya | 106/213 |
| 3,932,192 | 1/1976 | Nakashio | 260/9 |
| 3,997,703 | 12/1976 | Nakashio et al. | 428/457 |
| 4,002,173 | 1/1977 | Manning | 536/112 |
| 4,029,886 | 6/1977 | Nakashio et al. | 536/120 |

OTHER PUBLICATIONS

Offenlegungsschrift 25 33005, 12 Feb. 1976.

*Primary Examiner*—Theodore Morris
*Attorney, Agent, or Firm*—Stevens, Davis, Miller & Mosher

[57] ABSTRACT

Cross-linked pullulans are obtained by the reaction of pullulan with a cross-linking agent selected from the group consisting of polycarboxylic acids, halogenated dicarboxylic acids, polycarboxylic anhydrides, aldehyde compounds, N-methylol compounds, isocyanate compounds, metaphosphoric acid salts, divinyl compounds, bis-aziridine and bifunctional compounds of the formula, $$X-R-Z$$

wherein X and Z are each a halogen atom or an epoxy group and R is an aliphatic residue having 1 to 30 carbon atoms, in a solvent, and are useful as gels or beds for chromatography or in various fields requiring high degrees of water absorbency and retention.

7 Claims, No Drawings

CROSS-LINKED PULLULAN

The present invention relates to cross-linked pullulans. More particularly, it relates to cross-linked pullulans which are water-resistant without loss of the excellent properties of pullulan, for example, high degrees of transparency, toughness, adhesiveness, tackiness, gas impermeability and non-pollution, and also relates to cross-linked pullulans which are hydrophilic but hardly soluble in water with excellent swellability and mechanical properties, which are obtained by cross-linking pullulan, which is a water-soluble polymer, with various cross-linking agents.

As is well known, pullulan is a linear high polymer wherein units of maltotriose, which is a trimer of glucose, have been repeatedly bonded through the α-1,6-linkages which are different from the linkages of said trimer.

Although pullulan used in the present invention contains glucose units in its molecule, it is entirely different in its molecular structure from the well-known polysaccharides, for example, starch, oxidized starch, enzymated starch, etherified starch, cationic starch, aminated starch, cellulose, alkyl cellulose, hydroxyalkyl cellulose, carboxymethyl cellulose, gum arabic and the like. Therefore the properties of pullulan are also very different from that of those substances. For example, pullulan is easily soluble in cold water and forms an aqueous solution which is very stable with neither gelation nor retrogradation even on a long-term standing.

Pullulan is of course different in properties from those of water-soluble synthetic high polymers such as polyvinyl alcohol, polyacrylamide, polyacrylic acid, sodium polyacrylate and polyvinyl pyrrolidone.

At the present time, synthetic resins such as polyethylene, polypropylene, polystyrene, polyvinyl chloride, polymethyl methacrylate and the like are widely used but recently many problems arise when the resins are treated as waste. That is, the resins as waste cause pollution of the rivers and seas, polyvinyl chloride resins generate a poisonous hydrogen chloride gas on burning and resins such as polyethylene, polypropylene and polystyrene generate a large quantity of heat on burning thus shortening the life of burning furnaces.

It was found that pullulan is produced from a cheap material, it produces membranes, films, fibers and molded products which have high degrees of transparency, toughness and gas impermeability, and it is decomposed spontaneously in soil or water and that it does not generate a poisonous gas nor a large quantity of heat on burning thus causing no environmental pollution. That is, pullulan has excellent properties which can not be obtained with the existing resins.

Further, it also became apparent that pullulan is very superior as an adhesive, paint, binder, paper-converting agent and fiber-treating agent.

However, pullulan is easily soluble in cold water as described above and this is a serious defect in a practical use. It is therefore worthwhile to make pullulan water-insoluble.

Two methods may be considered to make pullulan water-insoluble. The one is introduction of a lipophilic functional group into pullulan and the other is cross-linking of pullulan with a cross-linking agent.

When pullulan is chemically modified by the introduction of a lipophilic functional group, molded products of the modified pullulan are deteriorated to some degree in toughness, gas impermeability and the like. For example, completely acetylated pullulan becomes insoluble in water but the gas impermeability thereof becomes about 1,000 times poorer than that of the pullulan and the impact strength thereof also becomes poor to a large extent. Therefore, this method may not be said to be a desirable method for making pullulan water-insoluble.

On the other hand, as high polymer materials have come to be widely used in the medical industry, food industry or agricultural and horticultural fields, hydrophilic high polymers have attracted a great interest. Particularly, water-insoluble, water-absorptive high polymer materials have been examined for their functional uses, for example, as materials for separation and purification such as various membranes and gels for liquid chromatography; as media for microorganisms and plants, as medical materials such as contact lens and suture-protective materials; and as sanitary materials making use of the water-absorptivity of the high polymers. Some are now in practical use.

However, when an improvement in the water absorption of the conventional hydrophilic gel materials is attempted, various problems appear. For example, the materials rapidly diminish in mechanical properties, or sometimes become toxic or inapplicable to living bodies. Therefore it may be said that hydrophilic gels having satisfactory properties in a practical use are very few. Further, preparation of the gel is complex or the gel is very expensive so that the use of the gel is extremely limited. As described above, the gels have many difficulties in practical use.

There are various gels, for example, synthetic gels such as cross-linked products of dextran, starch, polyvinyl alcohol or polyacrylamide, and natural gels such as agar gel. In general, as carrier gels for chromatography which are used for separation of compounds from the solutions thereof, there are desired gel materials which are applicable to a wide range of from low molecular weight compounds to high molecular weight ones.

Therefore, in the case of synthetic gel materials, there is employed a method wherein the three-dimensional size of networks of the swollen gels is controlled by changing the cross-linking density. That is, the gels having a high cross-linking density are applicable to fractionation of low molecular weight compounds, while the gels having a low cross-linking density to relatively high molecular weight compounds.

However, when the cross-linking density of the synthetic gel materials is lowered for fractionation of high molecular weight compounds, the gels themselves rapidly diminish in mechanical properties and become difficult to use for practical purposes. In general, therefore, agar gel having a high degree of gel strength is often used for fractionation in high molecular weight regions. However, agar gel has various problems, for example, temperature regions in which the gel is usable are extremely limited and moreover the gel becomes unusable when allowed to stand in a dry state.

An object of the present invention is to provide cross-linked pullulans which are hydrophilic but hardly soluble in water with excellent swellability and mechanical properties.

Another object of the present invention is to provide cross-linked pullulans useful for various uses as hydrophilic gels applicable to both water and some kinds of organic polar solvent, particularly, useful as materials for separation and purification of liquids on the basis of the molecular sieve effect.

A further object of the present invention is to provide a method for obtaining said hydrophilic gels useful as materials for separation and purification of liquids in a spherical form.

A still further object of the present invention is to provide cross-linked pullulans which are water-resistant without loss of the excellent properties of pullulan, for example, high degrees of transparency, toughness, gas impermeability and non-pollution. These objects can be achieved by providing cross-linked pullulans prepared by cross-linking pullulan with a suitable cross-linking agent.

That is, the present invention provides (1) hydrophilic gel materials, which are hardly soluble in water but water-swellable, prepared by cross-linking pullulan with a cross-linking agent selected from the group consisting of saturated or unsaturated polycarboxylic acids, polycarboxylic anhydrides, aldehyde compounds, N-methylol compounds, isocyanate compounds, metaphosphoric acid salts, divinyl compounds and bis-aziridine, (2) hydrophilic gel materials having a water absorption of 1 to 100 g/g at the swollen state in water (the term "water-absorption" means the number of grams of water absorbed by 1 g of a dry gel), which are prepared by reacting pullulan and a bifunctional compound of the formula, $$X-R-Z$$

wherein X and Z are each a halogen atom or an epoxy group and R is an aliphatic residue having 1 to 30 carbon atoms, (3) a method for the preparation of spherical hydrophilic gel materials by the reaction between pullulan and a bifunctional compound of the formula, $$X-R-Z$$

wherein X, Z and R are as defined above, which comprises conducting said reaction by dispersing an aqueous pullulan solution in a liquid dispersion medium which is immiscible with said aqueous pullulan solution and contains a dispersion stabilizer, and (4) cross-linked pullulans, which are water-resistant, prepared by reacting pullulan with polycarboxylic acids, polycarboxylic anhydrides or halogenated dicarboxylic acids and a catalyst.

The pullulan used in the present invention is not particularly limited to a process for the production thereof. At present, it can be isolated and recovered as a tacky substance secreted in a culture liquor of a strain belonging to the genus *Pullularia* which is an incomplete microorganism. That is, a strain of the species *Pullularia pullulans* is subjected to shaking culture at 24° C. for 5 days in a medium containing 10% of starch syrup, 0.5% of $K_2HPO_4$, 0.1% of NaCl, 0.02% of $MgSO_4.7H_2O$, 0.06% of $(NH_4)_2SO_4$ and 0.04% of yeast extract, or to the culture in a medium containing glucose as a carbon source, whereby pullulan is obtained as a tacky substance secreted from the cells into the culture liquor. If necessary, purified pullulan may be obtained by removing the cells from the culture liquor by centrifugation and subjecting the supernatant to methanol precipitation and separation. Pullulan somewhat varies in the physical properties depending upon the kind of the strain used. In the present invention, however, pullulan obtained from any strain may be used.

Further, as the pullulan used in the present invention, there may also be used pullulan derivatives which are water soluble and may be substituted with an alkyl, a hydroxyalkyl, a carboxyl, a sulfonic or an amino group.

The molecular weight of the pullulan used in the present invention is not particularly limited, but it is preferable within a range from $1.0 \times 10^4$ to $1 \times 10^6$, and more preferably $3.0 \times 10^4$ to $1 \times 10^6$.

The cross-linked pullulans of the present invention are obtained by reacting pullulan with a suitable cross-linking agent in a suitable solvent and if necessary in the presence of a suitable catalyst.

Said cross-linking agents include polycarboxylic acids, halogenated dicarboxylic acids, polycarboxylic anhydrides, aldehyde compounds, N-methylol compounds, isocyanate compounds, metaphosphoric acid salts, divinyl compounds, bis-aziridine and bifunctional compounds of the formula, $$X-R-Z$$

wherein X, Z and R are as defined above. The cross-linking agents are used in an amount of 0.1 to 100 parts by weight based on 100 parts by weight of pullulan.

Said solvents include water, amides (for example formamide, dimethyl formamide), amines (for example diethylene triamine, triethylene tetramine, ethanolamine, propylamine) and mixed solvents containing water as a main component, for example a water-acetone mixture. The solvents are used in an amount of 30 to 2,000 parts by weight based on 100 parts by weight of pullulan.

The reaction between pullulan and said cross-linking agent is generally carried out at a temperature of 15° to 150° C.

The present invention will be illustrated in more detail as follows.

As the cross-linking agents used for the preparation of the hydrophilic gel materials of the present invention, there may be used various compounds known as a cross-linking agent for hydroxyl group-containing high polymers. The compounds include saturated or unsaturated polycarboxylic acids for example oxalic acid, malonic acid, succinic acid, glutaric acid, tartaric acid, malic acid, methylsuccinic acid, dimethyl malonic acid, adipic acid, 2-oxyadipic acid, pimelic acid, suberic acid, azelaic acid, 1,1-cyclopropanedicarboxylic acid, 1,1-cyclobutanedicarboxylic acid, 1,1-, 1,2- or 1,3-cyclopentanedicarboxylic acid, 1,1-, 1,2- or 1,3-cyclohexanedicarboxylic acid, 4,5-cyclohexenedicarboxylic acid, diphenic acid, phthalic acid, terephthalic acid, 1,3,5-benzene tricarboxylic acid, pyromellitic acid, maleic acid, fumaric acid, methylmaleic acid, methylfumaric acid, mesaconic acid, itaconic acid, citraconic acid, glutaconic acid, muconic acid and dihydromuconic acid; halogenated dicarboxylic acids for example oxalic chloride, oxalic bromide, succinic chloride, adipic chloride, cis- or trans-1,4-cyclohexanedicarboxylic chloride, phthalic chloride, phthalic bromide, isophthalic chloride and diphenic acid chloride; polycarboxylic anhydrides for example maleic anhydride, dimethylmaleic anhydride, itaconic anhydride, citraconic anhydride, succinic anhydride, α,α- or α,β-dimethylsuccinic anhydride, α,β-diethylsuccinic anhydride, phenylsuccinic anhydride, glutaric anhydride, α-n-butyl- or α-phenyl-glutaric anhydride, citraconic anhydride, cis- or trans-cyclohexanedicarboxylic anhydride, 1,2,3,6-tetrahydrophthalic anhydride, phthalic anhydride, homophthalic anhydride and pyromellitic anhydride; aldehyde compounds for example formaldehyde, glyoxal, malonaldehyde, succinaldehyde, glutaraldehyde, adipaldehyde, malealdehyde and acrolein; N-methylol compounds for example N-methylolurea, N-methylolmelamine, N-methylol ethylene urea, N-methylol acrylamide and N,N'-dimethylol itaconamide; isocyanate compounds for example ethylene diisocyanate, trimethylene diisocyanate, tetramethylene diisocyanate, pentamethylene diisocyanate, hexamethylene diisocyanate, heptamethylene diisocyanate, octamethylene diisocyanate, decamethylene diisocyanate, 2,4-tolylene diisocyanate, 2,6-tolylene diisocyanate, m-phenylene diisocyanate, p-phenylene diisocyanate and m-toluylene diisocyanate; metaphosphoric acid salts for example sodium trimetaphosphate and potassium trimetaphosphate; bis-aziridine; divinyl ether and divinyl sulfone.

The reaction between pullulan and the above-described cross-linking agent is carried out in the presence of the above-described solvent which is capable of dissolving or swelling pullulan, in order to allow the reaction to proceed as uniformly as possible. It is obvious however that these solvents must properly be selected within those giving no adverse effect to the cross-linking reaction, depending upon the kind of the cross-linking agent. The amount of the solvent is within a range to 30 to 2,000 parts by weight, preferably 100 to 800 parts by weight, based on 100 parts by weight of pullulan.

The reaction between pullulan and the cross-linking agents sometimes requires a catalyst. When the catalyst is used, there are added one or more of the well-known catalysts used for the reaction between hydroxyl group-containing polymers and the above-described cross-linking agents. The catalysts include acidic catalysts for example sulfuric acid, hydrochloric acid, acetic acid, zinc chloride, magnesium chloride, p-toluenesulfonic acid, β-naphthalenesulfonic acid; basic catalysts for example sodium hydroxide, potassium hydroxide, calcium hydroxide, pyridine, ethylenediamine, triethylene tetramine; and others. When the acidic catalyst is used, it is desirable to use as mild catalyst as possible in order to avoid decomposition of pullulan.

The amounts of the cross-linking agent and catalyst used depend upon the kinds thereof, the molecular weight of pullulan and the amount of the solvent. The amounts are generally 0.1 to 100 parts by weight for the cross-linking agent and 0.001 to 50 parts by weight for the catalyst, based on 100 parts by weight of pullulan. The reaction temperature is determined in connection with the reaction time and other conditions, and generally in a range of 15° to 150° C.

The hydrophilic gel materials thus obtained have a water-absorption of more than 0.1 g/g, preferably more than 0.2 g/g, at the swelling equilibrium in water. The water-absorption is controlled by properly selecting the molecular weight of pullulan, the kind and amount of the cross-linking agent and the cross-linking conditions.

As may be understood by the foregoing explanation, the hydrophilic gel materials of the present invention are cross-linked pullulans, which form hydrophilic gels by absorbing water, and may be formed into any shape such as film, sheet, cylinder, rod, fiber, granule and sponge-like shapes depending upon the use thereof.

Among the hydrophilic gel materials of the present invention, those which are particularly used as a material for separation and purification are preferably cross-linked pullulans having a water absorption of 1 to 100 g/g. Such cross-linked pullulans are produced by the reaction between pullulan and bifunctional compounds as a cross-linking agent in the presence of the above-described basic catalyst.

The bifunctional compounds of the formula, X-R-Z, include epichlorohydrin, epibromohydrin, dichlorohydrin, dibromohydrin, 1,2-3,4-diepoxybutane, diglycidyl ether, 1,4-butanediol di-glycidyl ether, 1,6-hexanediol di-glycidyl ether, glycerin di-glycidyl ether, ethylene glycol di-glycidyl ether, triethylene glycol di-glycidyl ether, neopentyl glycol di-glycidyl ether and other similar compounds.

In general, the reaction between pullulan and the bifunctional compounds is advantageously carried out using water as a solvent. If desired, the foregoing other solvents or mixed solvents containing water may be used so long as they give no adverse effect to this reaction. A preferred basic catalyst is sodium hydroxide.

The water-absorption of the hydrophilic gel materials of the present invention depends upon the molecular weight of pullulan, concentration ratio of pullulan to the bifunctional compound in solvent, reaction temperature and reaction time. If the other reaction conditions are fixed, the water-absorption of the resulting gel increases with increase of the amount of solvent, and decreases with increase of the molecular weight of pullulan or increase of the amount of bifunctional compound. Consequently, gels having a desired water-absorption are obtained by properly selecting these conditions within the allowable ranges thereof.

The amount of solvents used for the reaction varies with the molecular weight of pullulan and generally is 30 to 2,000 parts by weight, preferably 400 to 700 parts by weight, based on 100 parts by weight of pullulan.

The amount of bifunctional compounds is properly determined depending upon the kind thereof and other reaction conditions and generally is 5 to 100 parts by weight based on 100 parts by weight of pullulan.

The amount of basic substances as a catalyst is in the range of 0.001 to 50 parts by weight, generally 0.1 to 10 parts by weight, based on 100 parts by weight of pullulan. However, when halogen-containing bifunctional compounds such as epichlorohydrin are used, it is necessary for completion of the reaction to use the basic substances in an amount sufficient to neutralize the hydrogen halide produced by dehydrohalogenation. Therefore the amount of the basic substances is determined depending upon the amount of bifunctional compounds used. In general, it is convenient to carry out the neutralization with the same kind of basic substance as that used as a catalyst.

The reaction temperature is determined in connection with the reaction time. In the method of the present invention, the cross-linked products can be obtained even at relatively low temperatures but it takes a long time for completion of the reaction. On the other hand, when the reaction temperature is raised too high, undesirable side reactions easily occur. Therefore the reaction temperature is generally 15° to 90° C., preferably 30° to 70° C.

The reaction comes to an end in 1 to 24 hours in general but it is desirable to complete the reaction in 2 to 5 hours. The cross-linked products are sometimes produced within 10 minutes depending upon the reaction conditions. When cross-linked products are obtained by such a reaction, it is sometimes desirable to subject them to an after-curing at temperatures somewhat higher than the initial ones. In general, the after-curing temperature is higher by about 10° to 20° C. than the temperature of the preceding reaction. The after-curing is sufficiently achieved within about 7 hours in general, and it is desirable to complete the curing within 2 to 3 hours. After completion of the after-curing, the resulting products are neutralized, washed and dried.

The hydrophilic gel materials obtained by the aforesaid reaction exhibit an excellent swellability not only to water but also to organic polar solvents such as dimethylformamide. For example, cross-linked pullulans obtained with epichlorohydrin exhibit almost the same degree of swellability both to water and to dimethylformamide. This is a characteristic which can not be observed in the case of the conventional gels resulting from polysaccharides.

Since the hydrophilic gel materials of the present invention have such a swellability, they exhibit a molecular sieve effect on various compounds which are dissolved not only in aqueous solvents but also in organic polar solvents such as dimethylformamide, and thus they are expected to be useful in the fields of separation and purification such as desalting, waste water treatment and the like. Preferred shapes of the cross-linked products used for such purposes are spheres having a diameter of 10 to 500μ.

In the present invention, such spherical hydrophilic gel materials are produced by the reaction between pullulan and the above-said cross-linking agent in a two phase system, that is, the reaction is carried out by dispersing an aqueous pullulan solution, as droplets, in a liquid dispersion medium which is immiscible with said aqueous pullulan solution and contains a dispersion stabilizer.

The dispersion medium used in the present invention includes hydrocarbons such as n-hexane, heptane, isoheptane, isooctane, benzene, toluene, xylene, kerosene, cyclohexane, methylcyclohexane and turpentine oil, and halogenated hydrocarbons such as dichloromethane, 1,2-dichloroethane, dichloropentane, monochlorobenzene, o-dichlorobenzene and trichlorobenzene. The amount of water in the aqueous pullulan solution is as described above, i.e. 30 to 2,000 parts by weight, preferably 400 to 700 parts by weight, based on 100 parts by weight of pullulan.

The dispersion stabilizers used for dispersing the aqueous pullulan solution in the dispersion medium include polyvinyl acetate, polyisobutylene, cellulose acetate butyrate, polystyrene, polyethylvinyl ether, polymethyl methacrylate and the like. These stabilizers are high molecular weight polymers which are immiscible with the aqueous pullulan solution but are soluble in the dispersion medium.

In general, in order to disperse the aqueous pullulan solution in the form of droplets having a desired dimension, it can sufficiently be achieved with the aid of the above-said dispersion stabilizer and stirring of the reaction system. If necessary, a detergent type surfactant may be added to the system. In carrying out the method of the present invention, it is sufficient for the reaction equipment to have a stirrer which operates effectively and with an accurately controllable speed. Therefore, special equipment is not required.

Although the reaction can be carried out in various ways the following method is favorable: an aqueous pullulan solution containing a definite proportion of the basic substance as a catalyst is suspended, as droplets having a desired dimension, in the dispersion medium which is kept constant in temperature, stirring speed and proportion of the dispersion stabilizer, and then the bifunctional compound is added, if necessary stepwise, to the resulting two phase system to carry out the reaction. The resulting spherical cross-linked product is separated by filtration or centrifugation, washed to remove the dispersion stabilizer and neutralized in water, followed by desalting, purification and drying.

The hydrophilic gel materials of the present invention are transparent in the swollen state and keep a desirable gel strength even at a high water-absorption. Consequently, they can be used not only as gels or beds for chromatography but also in various fields which require high degrees of water absorbency and retention.

Finally, the cross-linking agents used for the preparation of the water-resistant pullulans of the present invention include saturated or unsaturated polycarboxylic acids, polycarboxylic anhydrides and dihalogenated dicarboxylic acids as described hereinbefore. In the cross-linking of pullulan with polycarboxylic acids, the following catalysts are used: mineral acids (for example sulfuric acid, hydrochloric acid, phosphoric acid), organic acids (for example p-toluenesulfonic acid, β-naphthalenesulfonic acid), metal oxides (for example iron oxide, copper oxide, lead oxide, zinc oxide, nickel oxide, cobalt oxide, aluminum oxide), acetates (for example sodium acetate, potassium acetate, calcium acetate, magnesium acetate, copper acetate), carbonates (for example potassium carbonate, zinc carbonate, calcium carbonate, silver carbonate, sodium carbonate, barium carbonate, magnesium carbonate), chlorides (for example magnesium chloride, zinc chloride, aluminum chloride, calcium chloride, mercury chloride, titanium chloride), hydroxides (for example sodium hydroxide, potassium hydroxide, aluminum hydroxide, calcium hydroxide, titanium hydroxide, magnesium hydroxide) and alkoxides (for example ethoxide, methoxide, isopropoxide and t-butoxide of sodium or potassium).

In the cross-linking of pullulan with the acid anhydrides or halogenated dicarboxylic acids, the following catalysts are used: organic amines (for example triethylamine, pyridine, morpholine, piperidine, N,N-dimethylaniline), alkoxides (for example ethoxide, methoxide, isopropoxide and t-butoxide of sodium or potassium), carbonates of alkali metals or alkaline earth metals (for example sodium carbonate, potassium carbonate, magnesium carbonate, calcium carbonate) and alkali metal hydroxides (for example sodium hydroxide, potassium hydroxide).

These cross-linking agent and catalyst are added to the solution containing pullulan. The amounts of cross-linking agent and catalyst depend upon the kinds thereof and the purposes of use. In general, the amount of cross-linking agents is 0.1 to 50 parts by weight based on 100 parts by weight of pullulan and that of catalysts is 0.001 to 50 parts by weight based on 100 parts by weight of pullulan.

The solvents are as exemplified above and they may be used alone or in combination. However, it is obvious that the solvents be properly selected depending upon the kinds of cross-linking agent and catalyst so long as they give no adverse effect to the cross-linking reaction.

The water-resistant pullulans of the present invention are preferably used for paper-converting agents, fiber-treating agents, paints and adhesives, and for formed products such as membranes, films, sheets, fibers, pipes, rods, blocks and the like. In each application described above, the water-resistant pullulan must be more insensitive to water than required in the aforesaid hydrophilic gel materials. It is favorably less than 0.1 g/g in terms of the water-absorption. Consequently, the reaction conditions are properly selected to meet the applications described above.

The water-resistant pullulans of the present invention may be obtained during molding or after these processes, depending upon the use. In general, the cross-linking is completed by heat-treatment after the pullulan solution containing the cross-linking agent and catalyst has been molded, coated, impregnated or subjected to other desired treatments. The heat treatment conditions are not particularly limited but they vary according to the kinds and amounts of the cross-linking agent and catalyst. The temperature are preferably lower than 150° C. because pullulan decomposes above 250° C.

The pullulan solution may be admixed with additives such as a filler, colorant and the like, so long as the cross-linking is not affected adversely.

The present invention will be illustrated more specifically with reference to the following examples, which are not intended to limit the present invention thereto. All parts in the examples are by weight. A water-absorption or an absorption percentage in the examples means the weight (g) of water or a specified liquid which is absorbed by one gram of the cross-linked pullulan when the pullulan is dipped in water or the liquid.

EXAMPLE 1

Ten parts of pullulan having an average molecular weight of 100,000 were dissolved in 100 parts of N,N'-dimethylformamide at 70° C. After adding 5 parts of adipic acid and 1 part of p-toluenesulfonic acid as a catalyst to the solution, stirring of the mixture was continued at 70° C. for 10 hours. The reaction mixture was coated on a glass plate and heat-treated at 130° C. for 5 hours. The film-like cross-linked product thus obtained was insoluble in water and had a water-absorption of 3 g/g.

EXAMPLE 2

Ten parts of pullulan having an average molecular weight of 50,000 were dissolved in 100 parts of water. After adding 10 parts of adipic chloride and 10 parts of sodium hydroxide to the solution, the mixture was reacted at 95° C. for 5 hours. The reaction solution was coated on a glass plate and heat-treated at 130° C. for 5 hours. The film-like cross-linked product thus obtained was insoluble in water and had a water-absorption of 1.5 g/g.

EXAMPLE 3

Ten parts of pullulan having an average molecular weight of 39,000 were dissolved in 100 parts of N,N'-dimethylformamide and then 5 parts of maleic anhydride and 1 part of pyridine were added thereto. The mixture was reacted at 70° C. for 20 minutes. The reaction product was precipitated with acetone, separated, crushed by means of a mixer and dried at 70° C. under reduced pressure to obtain 12 parts of pale yellowish brown powders. The powdery cross-linked product thus obtained was insoluble in water and had a water-absorption of 25 g/g.

EXAMPLE 4

Ten parts of pullulan having an average molecular weight of 295,000 were dissolved in 100 parts of N,N'-dimethylformamide and then a solution of 0.5 part of 2,4-tolylene diisocyanate in 100 parts of N,N'-dimethylformamide was added thereto. The mixture was reacted at 70° C. for 10 minutes. The reaction product was crushed by means of a mixer, washed with acetone and dried to obtain 9.5 parts of pale yellowish brown powders. The powdery gel thus obtained was insoluble in water and had a water-absorption of 0.5 g/g.

EXAMPLE 5

Ten parts of pullulan having an average molecular weight of 100,000 were dissolved in 50 parts of water and then 10 parts of 25% aqueous glutaraldehyde solution and 0.5 part of magnesium chloride were added thereto. After the mixture was made into a uniform solution, the solution was coated on a glass plate and heat-treated at 80° C. for 4 hours. The film-like cross-linked product thus obtained was insoluble in water and had a water-absorption of 1.65 g/g.

EXAMPLE 6

Ten parts of pullulan having an average molecular weight of 100,000 were dissolved in 100 parts of water. After adding 5 parts of divinyl-sulfone and 1 part of sodium carbonate to the solution, the mixture was reacted at 45° C. for 1 hour. The resulting reaction product had a water-absorption of 5.2 g/g.

EXAMPLE 7

Ten parts of pullulan having an average molecular weight of 360,000 were dissolved in 50 parts of water and then 5 parts of N-methylol ethylene urea and 0.1 part of magnesium chloride were added thereto. After the mixture was made into a uniform solution, the solution was coated on a glass plate and heat-treated at 130° C. for 5 hours. The cross-linked product thus obtained was insoluble in water and had a water-absorption of 2.3 g/g.

EXAMPLE 8

100 parts of pullulan having an average molecular weight of 50,000 were uniformly dissolved in 350 parts of water and then 100 parts of 5-N aqueous sodium hydroxide solution was added thereto. The mixed solution was kept at 45° C. with stirring and reacted with addition of 28 parts of epichlorohydrin. Seven minutes after the addition of epichlorohydrin, gelation of the reaction solution was observed. Thereafter, the solution was reacted for 7 hours with no stirring. After completion of the reaction, the water-insoluble, swollen product was crushed by means of a mixer, washed with water and neutralized with dilute hydrochloric acid. Next, water-washing and filtration of the product were repeated several times and the product was shrunk with ethanol and finally dried at 70° C. for 24 hours in vacuo. The cross-linked product thus obtained had a water-absorption of 11.3 g/g. When the product was swollen in dimethylformamide, it showed an absorption percentage of 11.0 g/g.

EXAMPLE 9

The reaction was carried out in the same manner as in Example 1, except that the average molecular weight of pullulan was 50,000 and that 50 parts of 5-N aqueous sodium hydroxide solution and 14 parts of epichlorohydrin were used. In this case, gelation started 10 minutes after the addition of epichlorohydrin. The resulting cross-linked product had a water-absorption of 20.6 g/g.

EXAMPLE 10

100 parts of pullulan having an average molecular weight of 39,000 were dissolved in 350 parts of water. Thereafter, 100 parts of 0.5-N aqueous sodium hydroxide solution and further 20 parts of ethylene glycol diglycidyl ether were added thereto and the mixture was reacted at 45° C. for 4 hours. Next, purification and drying were carried out in the same manner as in Example 1 to obtain powdery cross-linked product. The product had a water-absorption of 53.3 g/g.

EXAMPLE 11

100 parts of pullulan having an average molecular weight of 39,000 were dissolved in 100 parts of water and then 100 parts of 5-N aqueous sodium hydroxide solution was added thereto. The mixture was made uniform. This mixed solution was gradually added to a dispersion medium comprising 15 parts of polyvinyl acetate and 800 parts of toluene and dispersed in the medium as liquid droplets. During that time, the stirrer equipped to the reaction vessel was controlled to rotate at 800 r.p.m. One hour after the addition of the aqueous solution, 25 parts of epichlorohydrin was added thereto and the mixture was reacted at 50° C. for 3 hours. After the reaction was completed, the reaction mixture was cooled to room temperature and treated according to the following procedure.

Firstly, the resulting cross-linked product was deposited at the bottom of the reaction vessel followed by decantation. The cross-linked product was dispersed in 500 parts of toluene and filtered and this operation was repeated three times to remove the polyvinyl acetate.

Next, the cross-linked product thus obtained was washed by dispersing it in methanol, filtered, re-dispersed in water and neutralized with dilute hydrochloric acid. The neutralized solution was decantated and filtered. Dispersion in water, decantation and filtration were repeated several times to purify the resulting cross-linked product. Finally, the cross-linked product was dispersed in water, shrunk with ethanol, filtered and dried at 70° C. for 24 hours in vacuo to obtain 85 parts of the dry cross-linked product.

The dry cross-linked product was sieved into fractions, 250–125μ, 125–100μ, 100–74μ and 74–37μ. The particles of each fraction were accurately spherical ones. The cross-linked product had a water-absorption of 3.5 g/g. The absorption percentage of the product were 3.1 g/g and 0.2 g/g for dimethylformamide and chloroform, respectively.

EXAMPLE 12

100 parts of pullulan having an average molecular weight of 50,000 were dissolved in 200 parts of water and then 100 parts of 5-N aqueous sodium hydroxide solution was added thereto. The mixture was made into a uniform solution. The reaction was carried out in the same manner as in Example 11 to obtain 73 parts of the spherical cross-linked product. The product had a water absorption of 6.0 g/g.

EXAMPLE 13

The reaction was carried out in the same manner as in Example 11, except that the average molecular weight of the pullulan used was 100,000. The cross-linked product obtained was of accurately spherical particle and had a water absorption of 2.1 g/g.

EXAMPLE 14

100 parts of pullulan having an average molecular weight of 100,000 were dissolved in 350 parts of water and then 50 parts of 5-N aqueous sodium hydroxide solution were added thereto. The mixture was reacted with an addition of 10 parts of epichlorohydrin in the same manner as in Example 11. The cross-linked product obtained had a spherical shape and a water-absorption of 31.0 g/g.

EXAMPLE 15

Ten parts of pullulan having a molecular weight of 150,000 were dissolved in 100 parts of N,N-dimethylformamide at 70° C. The solution was cooled to room temperature and 5 parts of adipic acid and 2 parts of p-toluenesulfonic acid as a catalyst were added thereto. The mixture was heated at 70° to 100° C. for 10 hours with stirring. The reaction solution was coated on a glass plate to prepare a film which was then heat-treated at 130° C. for 5 hours. The film thus obtained was highly water-proof and exhibited a water-absorption of less than 0.1 g/g after being dipped in water.

EXAMPLE 16

Ten parts of pullulan having a molecular weight of 150,000 were dissolved in 100 parts of water and then 10 parts of sodium hydroxide and 10 parts of adipic chloride were added thereto in that order. The mixture was heated at 100° C. for 5 hours with stirring. The reaction mixture was coated on glass plate to prepare a film which was then heat-treated at 130° C. for 5 hours. The film thus obtained was highly water-proof and had a water-absorption of less than 0.1 g/g.

What is claimed is:

1. A hydrophilic gel having a water absorption of 1 to 100 g/g at the swollen state in water which is obtained by adding dropwise an aqueous pullulan solution to a dispersion medium which is immiscible with said aqueous solution and contains a dispersion stabilizer to form a two-phase system, and adding epichlorohydrin to the two-phase system to effect the reaction between pullulan and epichlorohydrin, whereby said hydrophilic gel having a diameter of 10 to 500μ is obtained.

2. A hydrophilic gel according to claim 1, wherein said reaction is carried out using said epichlorohydrin in a amount of 5 to 100 parts by weight based on 100 parts by weight of pullulan.

3. A hydrophilic gel according to claim 1, wherein said reaction is carried out at a temperature of 15° to 150° C.

4. A hydrophilic gel according to claim 1, wherein said reaction is carried out in the presence of a catalyst of at least 0.001 part by weight based on 100 parts by weight of pullulan.

5. A hydrophilic gel according to claim 1, wherein said dispersion medium is n-hexane, heptane, isoheptane, isooctane, benzene, toluene, xylene, kerosene, cyclohexane, methylcyclohexane, turpentine oil, dichloromethane, 1,2-dichloroethane, dichloropentane, monochlorobenzene, o-dichlorobenzene or trichlorobenzene.

6. A hydrophilic gel according to claim 1, wherein said dispersion stabilizer is polyvinyl acetate, polyisobutylene, cellulose acetate butyrate, polystyrene, polyethylvinyl ether or polymethyl methacrylate.

7. A method for the preparation of a hydrophilic gel having a water adsorption of 1 to 100 g/g at the swollen state in water, which comprises adding dropwise an aqueous pullulan solution to a dispersion medium which is immiscible with said aqueous solution and contains a dispersion stabilizer to form a two-phase system, and adding epichlorohydrin to the two-phase system to effect the reaction between pullulan and epichlorohydrin, whereby said hydrophilic gel having a diameter of 10 to 500$\mu$ is obtained.

* * * * *